(12) United States Patent
Kajikawa

(10) Patent No.: US 9,082,429 B2
(45) Date of Patent: Jul. 14, 2015

(54) OPTICAL DISC DEVICE AND FOCUS JUMP METHOD

(71) Applicant: Funai Electric Co., Ltd., Osaka (JP)

(72) Inventor: Kazuki Kajikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/336,024

(22) Filed: Jul. 21, 2014

(65) Prior Publication Data

US 2015/0023143 A1 Jan. 22, 2015

(30) Foreign Application Priority Data

Jul. 22, 2013 (JP) ................................. 2013-151743

(51) Int. Cl.
| | | |
|---|---|---|
| G11B 7/09 | (2006.01) | |
| G11B 7/24035 | (2013.01) | |
| G11B 7/00 | (2006.01) | |
| G11B 20/10 | (2006.01) | |

(52) U.S. Cl.
CPC .......... *G11B 7/24035* (2013.01); *G11B 7/0909* (2013.01); *G11B 20/10009* (2013.01); *G11B 2007/0013* (2013.01)

(58) Field of Classification Search
None
See application file for complete search history.

(56) References Cited

U.S. PATENT DOCUMENTS

| | | | |
|---|---|---|---|
| 2008/0117783 A1 | 5/2008 | Imai | |
| 2010/0074066 A1* | 3/2010 | Lee et al. | ............ 369/44.32 |
| 2010/0232275 A1 | 9/2010 | Tanaka | |

FOREIGN PATENT DOCUMENTS

| | | |
|---|---|---|
| JP | 2002-367193 A | 12/2002 |
| JP | 2008-130121 A | 6/2008 |
| JP | 2010-218609 A | 9/2010 |

* cited by examiner

*Primary Examiner* — Wayne Young
*Assistant Examiner* — Brian Butcher
(74) *Attorney, Agent, or Firm* — Morgan, Lewis & Bockius LLP

(57) ABSTRACT

The optical disc device includes an optical pickup, a focus-error-signal generation section for generating a focus error signal of the differential astigmatic method by using a parameter and an electric signal outputted from a photodetector in the optical pickup, a control section for controlling the optical pickup to make a focus jump operation, and a parameter value changing section for temporarily changing a value of the parameter to be used to generate a focus error signal of the differential astigmatic method by the focus-error-signal generation section when the focus jump operation is performed by using the focus error signal of the differential astigmatic method.

8 Claims, 12 Drawing Sheets

OPTICAL DISC DEVICE AND FOCUS JUMP METHOD

This non-provisional application claims priority under 35 U.S.C. §119(a) on Patent Application No. 2013-151743 filed in Japan on Jul. 22, 2013, the entire contents of which are hereby incorporated by reference.

BACKGROUND OF THE INVENTION

1. Field of the Invention

The present invention relates to an optical disc device compatible with multilayer optical discs having a plurality of recording layers on one side, as well as to a focus jump method for multilayer optical discs having a plurality of recording layers on one side.

2. Description of the Related Art

In recent years, multilayer optical discs having a plurality of recording layers on one side have been prevailing. For an optical disc device compatible with multilayer optical discs, at is necessary that the focus position of laser light emitted from the optical pickup be changed over among a plurality of recording layers during recording operation of information onto a multilayer disc or reproducing operation of information recorded on a multilayer disc. For this purpose, the optical disc device compatible with multilayer optical discs makes a focus jump for moving the focus position from a current recording layer to a target recording layer.

As to the focus jump, first, a pulse signal called kick pulse is fed as a focus drive signal to an actuator that drives an objective lens included in the optical pickup. As a result, the objective lens is accelerated and moved in a focus direction. Thereafter, when a focus error signal has satisfied a brake start condition, a pulse signal called brake pulse and directed inverse to the kick pulse is fed as a focus drive signal to the actuator. Thus, the objective lens is decelerated and stopped, so that the focus jump is completed.

Given large crosstalk of the focus error signal before the focus jump, the jump start position is varied, resulting in an unstable focus jump. Also, given that a large fake signal has occurred in the focus error signal during a focus jump, it may occur that the fake signal triggers the brake start condition so as to start braking at an erroneous position or to cause the brake start timing to be delayed by an effect of the fake signal, thus the focus jump becoming unstable.

In JP 2008-130121 A, a focus drive signal generated from a focus error signal of the astigmatic method is used for a focus jump with an aim of stabilizing the focus jump. Due to this, JP 2008-130121 A describes no proposal as to the stabilization of the focus jump using the focus drive signal generated from a focus error signal of the differential astigmatic method.

With use of a focus drive signal generated from a focus error signal of the differential astigmatic method, it is known that a fake signal is generated in the focus error signal due to stray light of the sub beam or the like during a focus jump. Against the occurrence of this fake signal, JP 2002-367193 A and JP 2010-218609 A take a countermeasure that no decision as to the focus position is done upon occurrence of a fake signal. However, with this countermeasure taken, there arises a need for grasping occurrence of the fake signal, causing complicated control to be involved as another problem.

SUMMARY OF THE INVENTION

In one aspect of the present invention, there is provided an optical disc device compatible with multilayer optical discs having a plurality of recording layers on one side, comprising: an optical pickup for applying light to an optical disc to detect return light from the optical disc by a photodetector; a focus-error-signal generation section for generating a focus error signal of a differential astigmatic method by using a parameter and an electric signal outputted from the photodetector; a control section for controlling the optical pickup to make a focus jump operation such that a focus position of the light is moved from a first recording layer to a second recording layer of the optical disc; and a parameter value changing section for temporarily changing a value of the parameter to be used to generate the focus error signal of the differential astigmatic method by the focus-error-signal generation section when the focus jump operation is performed by using the focus error signal of the differential astigmatic method.

In another aspect of the invention, there is provided a focus jump method for multilayer optical discs having a plurality of recording layers on one side, comprising: a first step of generating a focus error signal of a differential astigmatic method by using a parameter and an electric signal outputted from a photodetector of an optical pickup; and a second step of temporarily changing the value of the parameter to be used to generate the focus error signal of the differential astigmatic method when a focus jump operation for moving a focus position of applied light of the optical pickup from a first recording layer to a second recording layer of the multilayer optical disc is performed by using the focus error signal of the differential astigmatic method.

Significance and benefits of the present invention will become more apparent from description of embodiments of the invention given below. However, the following embodiments are no more than exemplary embodiments of the invention, and meanings of terms of the invention or its individual constituent elements are by no means limited to those described in the following embodiments.

DETAILED DESCRIPTION OF THE PREFERRED EMBODIMENTS

Figure 1:
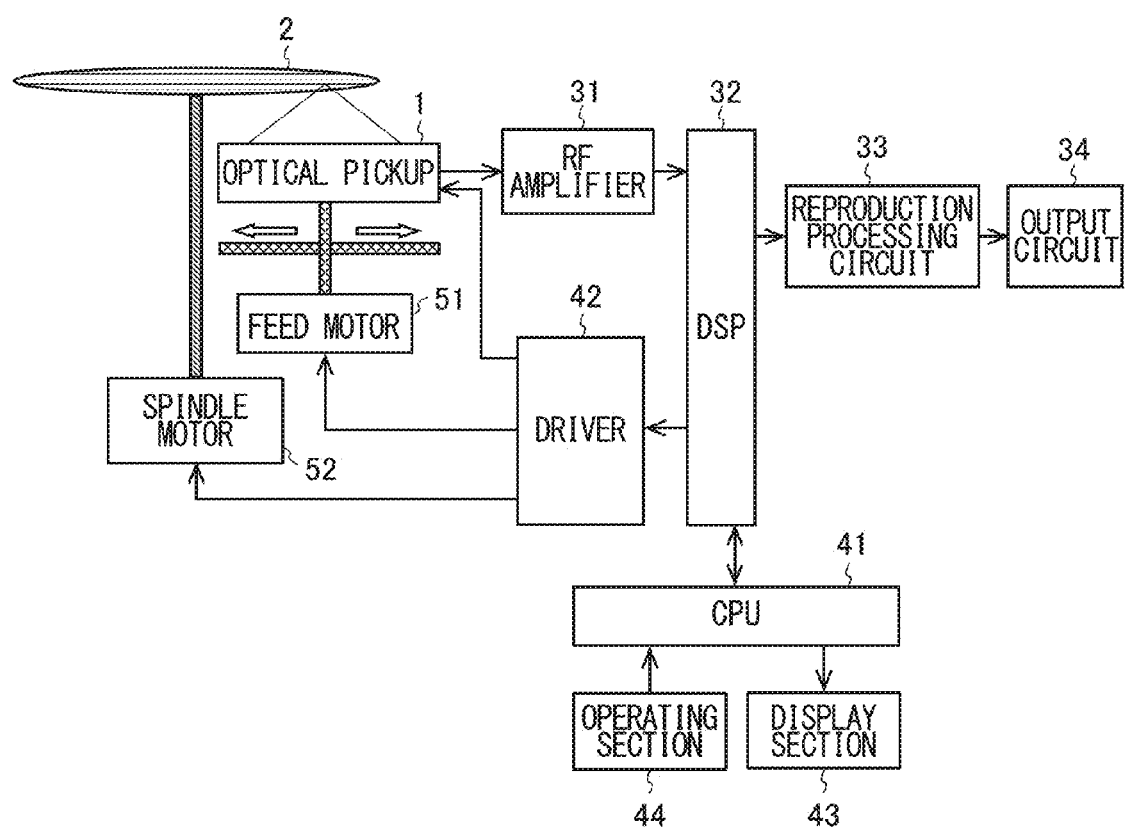
FIG. 1 is a view showing a configurational example of an optical disc device according to the present invention.

Embodiments of the present invention will be described below with reference to the accompanying drawings. FIG. 1 shows a configurational example of an optical disc device according to the invention. The optical disc device according to the invention may be either an optical disc device dedicated to reproduction only or an optical disc device enabled to fulfill both reproduction and recording.

The embodiments described below are given as examples only, and the invention is not limited to those embodiments. The embodiments may be carried out in various combinations thereamong, as required, as far as no contradictions are involved. Also, exemplary illustrations and modifications described in any one of the embodiments may be applied to the other embodiments as far as no contradictions are involved.

The optical disc device shown in FIG. 1, which is an optical disc device compatible with multilayer optical discs having a plurality of recording layers on one side, includes an optical pickup 1, an RF amplifier 31, a DSP (Digital Signal Processor) 32, a reproduction processing circuit 33, an output circuit 34, a CPU (Central Processing Unit) 41, a driver 42, a display section 43, an operating section 44, a feed motor 51, and a spindle motor 52.

The optical pickup 1 applies optical beams to an optical disc 2 to read various types of information such as audio information and video information recorded on the optical disc 2. The optical pickup 1 is capable of applying, to the optical disc 2, an infrared laser beam in the wavelength range of 780 nm (laser beam for CDs (Compact Discs)), a red laser beam in the wavelength range of 650 nm (laser beam for DVDs (Digital Versatile Discs)), and a blue laser beam in the wavelength range of 405 nm (laser beam for BDs (Blu-Ray (a registered trademark) Discs)). In addition, details of the inside of the optical pickup 1 will be described later.

Audio information and video information obtained by the optical pickup 1 are converted to sounds and images by the RF amplifier 31, the DSP 32, the reproduction processing circuit 33 and the output circuit 34, and the resultant sounds and images are outputted from unshown loudspeaker and monitor, respectively. The RF amplifier 31 amplifies audio signals, video signals and the like derived from the optical pickup 1. The DSP 32 and the reproduction processing circuit 33 perform various types of information processing (e.g., image processing) for reproduction on signals derived from the RF amplifier 31. The output circuit 34 performs D/A conversion or other processing on signals derived from the reproduction processing circuit 33 to output those signals to the unshown loudspeaker and monitor.

Also, the DSP 32 performs arithmetic processing based on a signal outputted from a photodetector 20 (see FIG. 2) to generate a focus error signal, a focus servo signal, a tracking error signal and the like.

The CPU 41 receives information from the operating section 44 to transfer the information to the DSP 32 and moreover transfer information derived from the DSP 32 to the display section 43.

The driver 42, based on instructions from the DSP 32, controls operations of the feed motor 51 and the spindle motor 52. The feed motor 51 moves the optical pickup 1 in radial directions of the optical disc 2. The spindle motor 52 drives the optical disc 2 in a rotational direction.

The driver 42, based on instructions from the DSP 32, also controls operations of an actuator 21 and a BEX (Beam Expander) motor 22 (see FIG. 2) within the pickup unit 1.

Figure 2:
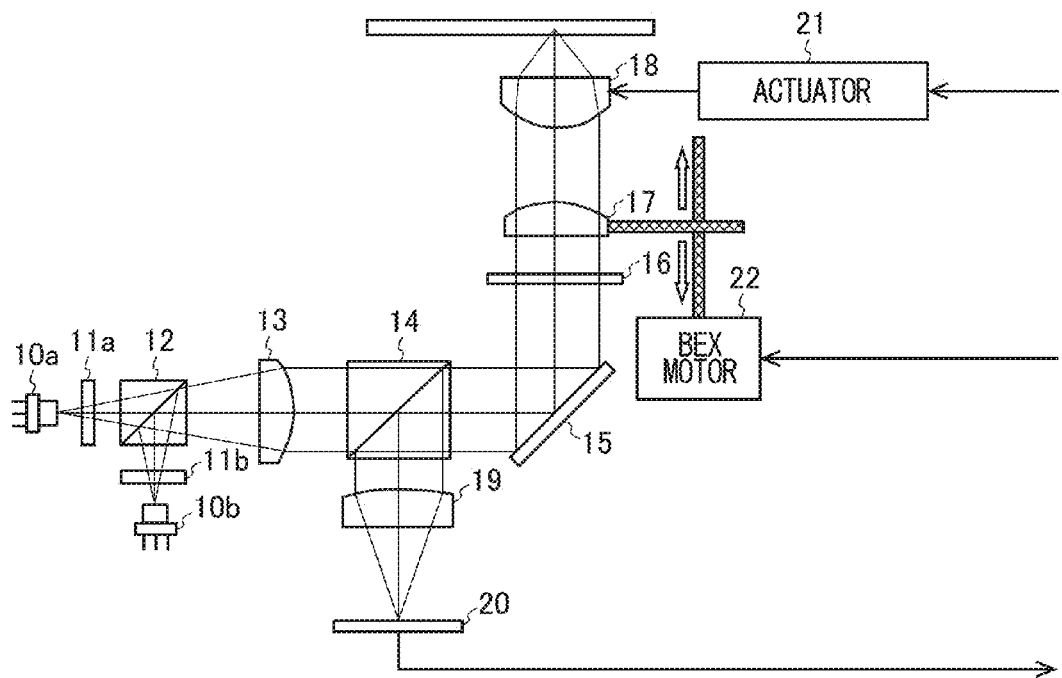
FIG. 2 is a view showing a configurational example of an optical pickup.

Next, FIG. 2 shows a configurational example of the optical pickup 1. In the configurational example shown in FIG. 2, the optical pickup 1 includes a first light source 10a, a second light source 10b, a first grating 11a, a second grating 11b, a dichroic prism 12, a collimator lens 13, a beam splitter 14, a deflecting mirror 15, a quarter wave plate 16, a collimator lens 17, an objective lens 18, a detector lens 19, a photodetector 20, an actuator 21, and a BEX motor 22.

The first light source 10a is a two-wavelength integrated LD capable of emitting an infrared laser beam in the wavelength range of 780 nm (laser beam for CDs) and a red laser beam in the wavelength range of 650 nm (laser beam for DVDs). The second light source 10b is an LD capable of emitting a blue laser beam in the wavelength range of 405 nm (laser beam for BDs).

The first grating 11a diffracts the laser beam emitted from the first light source 10a to output the diffracted light to the dichroic prism 12. The second grating 11b diffracts the laser beam emitted from the second light source 10b to output the diffracted light to the dichroic prism 12.

The dichroic prism 12 transmits the diffracted light outputted from the first grating 11a, and reflects the diffracted light outputted from the second grating 11b. Further, the dichroic prism 12 makes the diffracted light outputted from the first grating 11a and the diffracted light outputted from the second grating 11b coincident in optical axis to each other. The diffracted light (laser beam) transmitted or reflected by the dichroic prism 12 is fed to the collimator lens 13.

The collimator lens 13 converts the laser beam fed from the dichroic prism 12 into parallel light. The laser beam converted into parallel light by the collimator lens 13 is fed to the beam splitter 14.

The beam splitter 14, which functions as a light splitting element for splitting an incident laser beam, transmits the optical beam fed from the collimator lens 13 to lead the optical beam toward the optical disc 2, and reflects the reflected light reflected by the optical disc 2 to lead the reflected light toward the photodetector 20. The laser beam transmitted by the beam splitter 14 is fed to the deflecting mirror 15.

The deflecting mirror 15 reflects the optical beam transmitted by the beam splitter 14 to lead the optical beam to the optical disc 2. The deflecting mirror 15 is tilted by 45° to the optical axis of the laser beam fed from the beam splitter 14, so that the optical axis of the laser beam reflected by the deflecting mirror 15 is generally orthogonal to the recording surface of the optical disc 2.

The quarter wave plate 16, having a function of converting linearly polarized light into circularly polarized light and converting circularly polarized light into linearly polarized light, converts the laser beam of linearly polarized light reflected by the deflecting mirror 15 into circularly polarized light and feeds the converted light to the collimator lens 17, while the quarter wave plate 16 converts the laser beam of circularly polarized light reflected by the optical disc 2 into linearly polarized light and feeds the converted light to the deflecting mirror 15.

The collimator lens 17 can be moved in the optical-axis direction (up/down direction in FIG. 2) by the BEX motor 22.

In response to movement of the collimator lens 17, the laser beam emitted from the collimator lens 17 can be formed into divergent light or convergent light. Changing the state of the laser beam emitted from the collimator lens 17 in this way allows spherical aberration correction. The laser beam emitted from the collimator lens 17 is fed to the objective lens 18.

The objective lens 18 condenses the laser beam fed from the collimator lens 17 onto the recording surface of the optical disc 2. The objective lens 18 can be moved in, for example, up/down directions and leftward/rightward directions in FIG. 2 by the later-described actuator 21. The position of the objective lens 18 is controlled based on a focus servo signal and a tracking servo signal.

The reflected light reflected by the optical disc 2, passing through the objective lens 18, the collimator lens 17 and the quarter wave plate 16 in this order, is reflected by the deflecting mirror 15 and thereafter further reflected by the beam splitter 14 so as to be condensed by the detector lens 19 to a light-receiving element provided on the photodetector 20.

Figure 3:
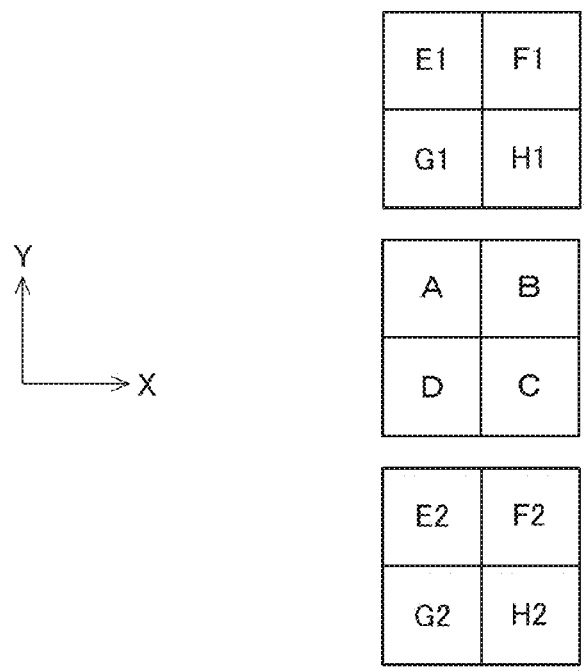
FIG. 3 is a view showing a light-receiving region of a photodetector.

The photodetector 20 converts optical information received by using the light-receiving element such as a photodiode into an electric signal (current signal), outputting the signal to the DSP 32 (see FIG. 1). As shown in FIG. 3, the photodetector 20 has four main light-receiving regions A to D equally divided in the X and Y directions, four sub light-receiving regions E1 to H1 equally divided in the X and V directions, and four sub light-receiving regions E2 to H2 equally divided in the X and Y directions. The photodetector 20 performs photoelectric conversion for the individual regions, respectively, to output electric signals. The main light-receiving regions A to D are regions for receiving 0th-order diffracted light (main beam), and the sub light-receiving regions E1 to H1 and E2 to H2 are regions for receiving 1st-order diffracted light (sub beam). In addition, the Y direction is parallel to the track directions of the optical disc 2.

Electric signals of the main light-receiving regions A to D are referred to as electric signals SA to SD, respectively. Electric signals of the sub light-receiving regions E1 to H1 are referred to as electric signals SE1 to SH1, respectively. Electric signals of the sub light-receiving regions E2 to H2 are referred to as electric signals SE2-SH2, respectively.

The DSP 32 has a tracking-error-signal generation circuit for generating a tracking error signal by using electric signals outputted from the photodetector 20, and a focus-error-signal generation circuit for generating a focus error signal by using electric signals outputted from the photodetector 20. In addition, details of the focus-error-signal generation circuit will be described later.

The actuator 21 moves the objective lens 18 in the radial direction of the optical disc 2 according to an objective lens drive signal generated and outputted by the driver 42 (see FIG. 1).

The actuator 21 is capable of performing not only tracking operation for moving the objective lens 18 in directions extending along the recording surface of the optical disc 2, but also tilt operation for tilting the objective lens 18 so as to swing the optical axis of the laser bears outputted from the objective lens 18 as well as focus operation for moving the objective lens 18 so as to make the objective lens 18 closer to or farther from the optical disc 2. An objective lens drive signal fed from the driver 42 (see FIG. 1) to the actuator 21 during the execution of the focus operation is referred to as focus drive signal.

Figure 4:
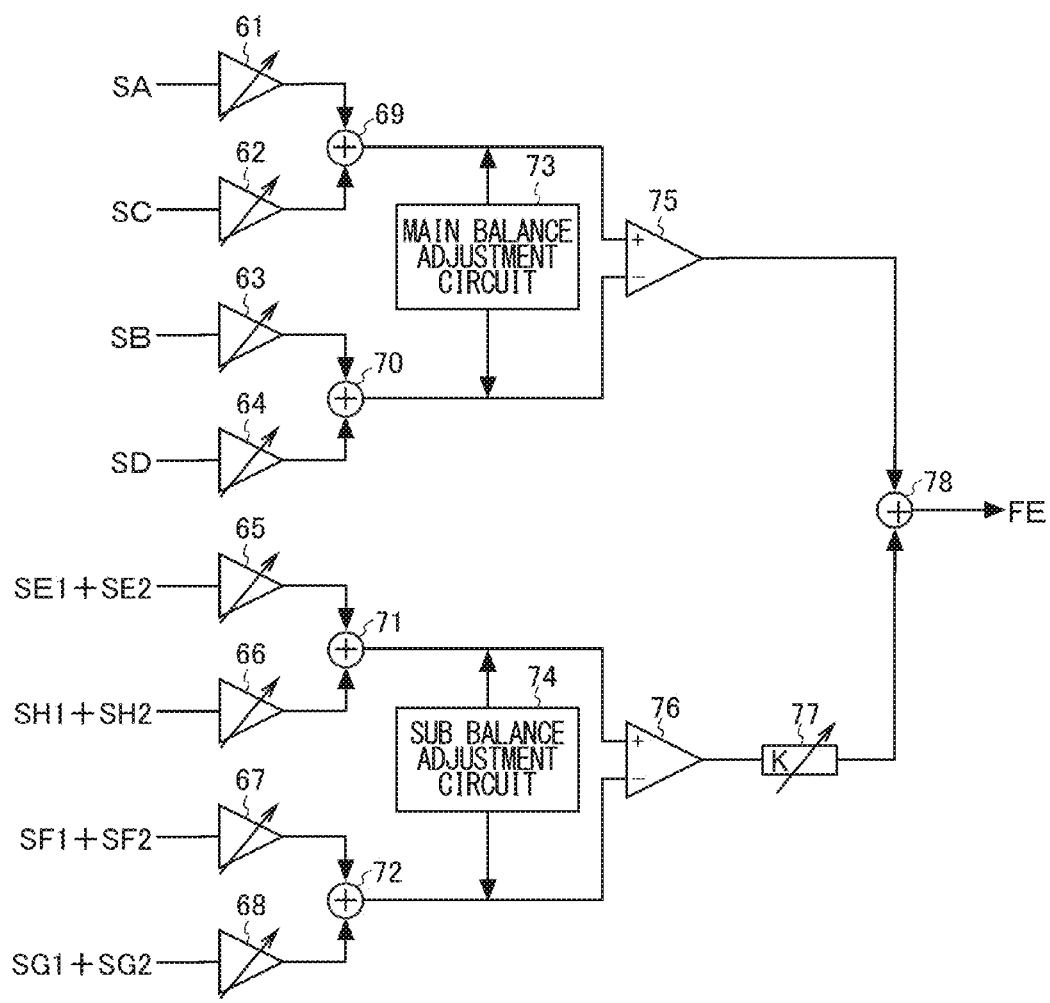
FIG. 4 is a view showing a configurational example of a focus-error-signal generation circuit.

Next, FIG. 4 shows a general configuration of the focus-error-signal generation circuit included in the DSP 32. The focus-error-signal generation circuit shown in FIG. 4 includes variable gain amplifiers 61 to 68 which are set to the same gain, adders 69 to 72 and 78, a main balance adjustment circuit 73, a sub balance adjustment circuit 74, a main differential amplifier 75, a sub differential amplifier 76, and a variable gain adjuster 77.

The adder 69 adds together an electric signal SA amplified by the variable gain amplifier 61 and an electric signal SC amplified by the variable gain amplifier 62. The adder 70 adds together an electric signal SB amplified by the variable gain amplifier 63 and an electric signal SD amplified by the variable gain amplifier 64. The main balance adjustment circuit 73 adds a first balance factor to a signal outputted from the adder 69 and adds a second balance factor to a signal outputted from the adder 70. An output signal of the adder 69 with the first balance factor added thereto is fed to a non-inverting input terminal of the main differential amplifier 75, while an output signal of the adder 70 with the second balance factor added thereto is fed to an inverting input terminal of the main differential amplifier 75. The main differential amplifier 75 generates a main push-pull signal from signals fed to the non-inverting input terminal and the inverting input terminal and outputs the resultant signal to the adder 78.

The adder 71 adds together electric signals SE1 and SE2 amplified by the variable gain amplifier 65 and electric signals SH1 and SH2 amplified by the variable gain amplifier 66. The adder 72 adds together electric signals SF1 and SF2 amplified by the variable gain amplifier 67 and electric signals SG1 and SG2 amplified by the variable gain amplifier 68. The sub balance adjustment circuit 74 adds a third balance factor to a signal outputted from the adder 71 and adds a fourth balance factor to a signal outputted from the adder 72. An output signal of the adder 71 with the third balance factor added thereto is fed to a non-inverting input terminal of the sub differential amplifier 76, while an output signal of the adder 72 with the fourth balance factor added thereto is fed to an inverting input terminal of the sub differential amplifier 76. The sub differential amplifier 76 generates a sub push-pull signal from signals fed to the non-inverting input terminal and the inverting input terminal and outputs the resultant signal to the variable gain adjuster 77. The variable gain adjuster 77 adjusts the amplitude of the sub push-pull signal by multiplying it K-fold (where K is 0 or a positive number) and outputs the adjusted signal to the adder 78.

The adder 78 adds together the main push-pull signal and the K-fold sub push-pull signal to generate a focus error signal FE.

Hereinbelow, for explanation's sake, a signal obtained by multiplying an electric signal SA by the gain of the variable gain amplifier and adding a balance factor thereto will be referred to as electric signal A. This is the case also with the electric signals SB to SB. Further, a signal obtained by multiplying an electric signal, which is an addition result of the electric signal SE1 and the electric signal SE2, by the gain of the variable gain amplifier and adding a balance factor thereto will be referred to as electric signal E. This is the case also with the electric signals SF1, SF2 to SH1 and SH2.

The focus-error-signal generation circuit shown in FIG. 4, when generating a focus error signal FE of the astigmatic method, sets the gain K of the variable gain adjustor 77 to 0 so as to use the main beam only. The focus error signal FE of the astigmatic method is expressed by the following Equation (1):

$$FE=(A-D)+(C-B) \tag{1}$$

Figure 5:
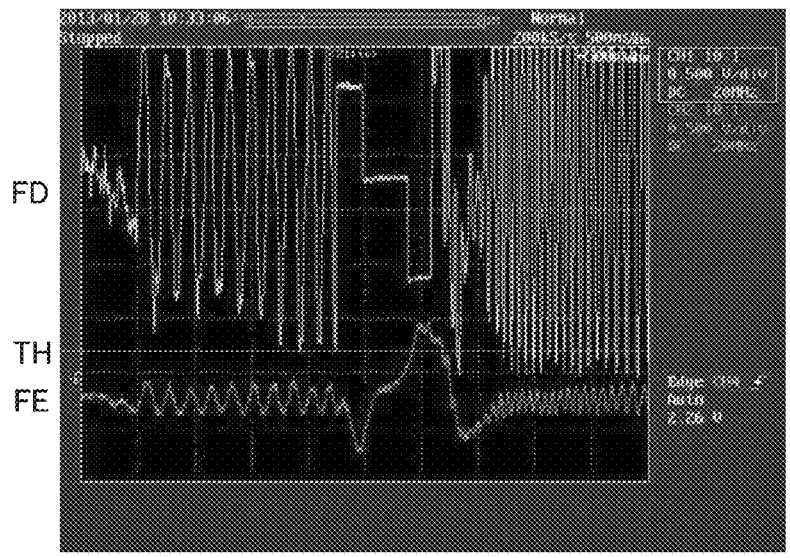
FIG. 5 is a view showing waveforms of a focus error signal of the astigmatic method and a focus drive signal.

FIG. 5 shows signal waveforms resulting when a focus jump was executed by using a focus drive signal FD generated from the focus error signal FE of the astigmatic method.

With the focus error signal FE of the astigmatic method, there arises crosstalk in the focus error signal FE on condition that the photodetector 20 is unbalanced in the Y direction (see FIG. 3) so that the push component (A−D) and the pull component (C−B) are not canceled out by each other.

Therefore, in the optical pickup 1 in which the photodetector 20 is unbalanced greatly in the Y direction, crosstalk of the focus error signal FE comes to largely affect the focus drive signal as shown in FIG. 5, so that the start position of the focus jump is varied, causing the focus jump to be unstable.

Meanwhile, the focus-error-signal generation circuit shown in FIG. 4, when generating a focus error signal FE of the differential astigmatic method, sets the gain K of the variable gain adjustor 77 to a positive number so as to use both the main beam and the sub beam. The focus error signal FE of the differential astigmatic method is expressed by the following Equation (2):

$$FE=(A-D)+(C-B)+K\times\{(E+H)-(F+G)\} \quad (2)$$

At the focus position, the right-side first term of Equation (2), namely 'A,' and 'K×E' are equal in amplitude and opposite in phase to each other, and so are 'D' and 'K×G'. Similarly, at the focus position, the right-side second term of Equation (2), namely 'C,' and 'K×H' are equal in amplitude and opposite in phase to each other, and so are B and 'K×F'. Therefore, at the focus position, the focus error signal FE of the differential astigmatic method is 0, so that crosstalk hardly occurs.

Figure 6:
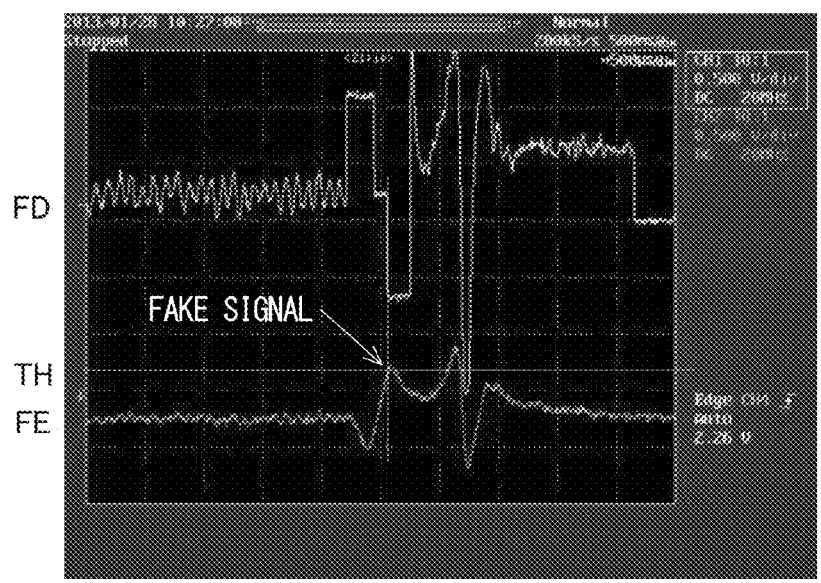
FIG. 6 is a view showing waveforms of a focus error signal of the differential astigmatic method and a focus drive signal.

FIG. 6 shows signal waveforms resulting when a focus jump was executed by using a focus drive signal FD generated from the focus error signal FE of the differential astigmatic method.

In the focus error signal FE of the differential astigmatic method, a fake signal is generated duo to stray light of the sub beam or the like during a focus jump. The magnitude of the fake signal greatly varies among the individual optical pickups 1 or the individual optical discs 2.

Therefore, when the fake signal of the focus error signal FE has exceeded the threshold TH of the brake start conditions as shown in FIG. 6, a brake begins to be applied at an erroneous position, causing a possibility that a target recording layer cannot be reached, resulting in a failure of the focus jump.

As apparent from the above description, the astigmatic method incurs an unstable focus jump due to large crosstalk, while the differential astigmatic method incurs an unstable focus jump due to a large fake signal.

First Embodiment

Accordingly, the optical disc device shown in FIG. 1 performs a focus jump according to the first embodiment so as to suppress the crosstalk of the focus error signal FE of the differential astigmatic method and moreover reduce the fake signal. Operations of the focus jump according to this embodiment are described below with reference to the flowchart shown in FIG. 7.

Upon start of a focus jump process, first, the DSP 32 turns off tracking control (step S10). Next, the BEX motor 22 moves the collimator lens 17 (step S20). The movement extent of the collimator lens 17 in step S20 may foe set to, for example, one half of a movement extent that is needed to make a change from a spherical aberration correction amount suitable for a current recording layer to a spherical aberration correction amount suitable for a target recording layer.

Next, the DSP 32 decides whether or not the focus jump to be executed this time is a focus jump using a focus drive signal FD generated from a focus error signal FE of the differential astigmatic method (step S30). It is noted that the optical disc device according to this invention makes switchover, as to the focus drive signal FD for use in focus jumps, between a focus drive signal FD generated from a focus error signal FE of the astigmatic method and a focus drive signal FD generated from a focus error signal FE of the differential astigmatic method, in response to various types of operations, the types of optical discs or the like. Such switchover may be implemented by, for example, adopting the astigmatic method for focus jumps until spinning-up operation (preparatory operation for enabling the reproduction, recording and the like on the optical disc 2) of the optical disc 2, which has been inserted into the optical disc device, is completed, and then adapting the differential astigmatic method for focus jumps after the spinning-up is completed.

If the focus jump to be executed this time is a focus jump using a focus drive signal FD generated from a focus error signal FE of the astigmatic method (NO at step S30), then the DSP 32 moves directly to the process of step S50 without executing the process of step S40.

If the focus jump to be executed this time is a focus jump using a focus drive signal FD generated from a focus error signal FE of the differential astigmatic method (YES at step S30), then the DSP 32 performs the process of step S40.

At step S40, the DSP 32 changes the gain K of the variable gain adjuster 77. Thus, the value of K in Equation (2) is changed. Changing process for K value is explained below with reference to the flowchart shown in FIG. 8.

First, the DSP 32 measures the amplitude of the focus error signal FE of the differential astigmatic method (step S41), and stores the measurement result (step S42). In addition, the processes of step S41 and step S42 may also be executed before starting of the focus jump process.

Next, the DSP 32 changes the value of K by reflecting the brake start condition onto the value of K (step S43). More specifically, the value of K is changed so that a maximum value of the fake signal becomes equal to or lower than the threshold TH of the brake start condition. For example, with the astigmatic method adopted, it follows that at the focus position, right-side 1st term of Eq. (2):right-side 2nd term of Eq. (2)=100:0, resulting in Eq. (1). With the differential astigmatic method adopted, it follows that at the focus position, right-side 1st term of Eq. (2):right-side 2nd term of Eq. (2)=50:50. On condition that the threshold TH of the brake start condition is ½ of the S-shaped amplitude, the focus error signal FE remains equal to or lower than the threshold TH of the brake start condition until right-side 1st term of Eq. (2):right-side 2nd term of Eq. (2)=50:25. Therefore, the K value, when being 1, may appropriately be changed to 0.5.

Next, the DSP 32 measures the amplitude of the focus error signal EE after the changing of the K value (step S44). Then, the DSP 32 decides whether or not the amplitude of the focus error signal FE is not larger than a certain level (step S45). More specifically, the DSP 32 decides whether or not the latest amplitude of the focus error signal FE has a difference of less than +3 dB from the initial amplitude of the focus error signal FE stored at step S42.

If the latest amplitude of the focus error signal FE has a difference of less than +3 dB from the initial amplitude of the focus error signal FE stored at step S42 (YES at step S45), then the K value changing process is ended.

If the latest amplitude of the focus error signal FE does not have a difference of less than +3 dB from the initial amplitude of the focus error signal FE stored at step S42 (NO at step S45), then the DSP 32 increases the K value by a specified extent (step S46), thereafter returning to step S44.

The amplitude of the focus error signal FE generally corresponds to the quantity of crosstalk. Therefore, when the amplitude of the focus error signal FE has become too large due to the change of the K value for reduction of the fake signal executed at step S43 so that the quantity of crosstalk has become too large, the K value can be increased so as to reduce the quantity of crosstalk by executing the processing loop of above-described steps S44 to S46.

Figure 7:
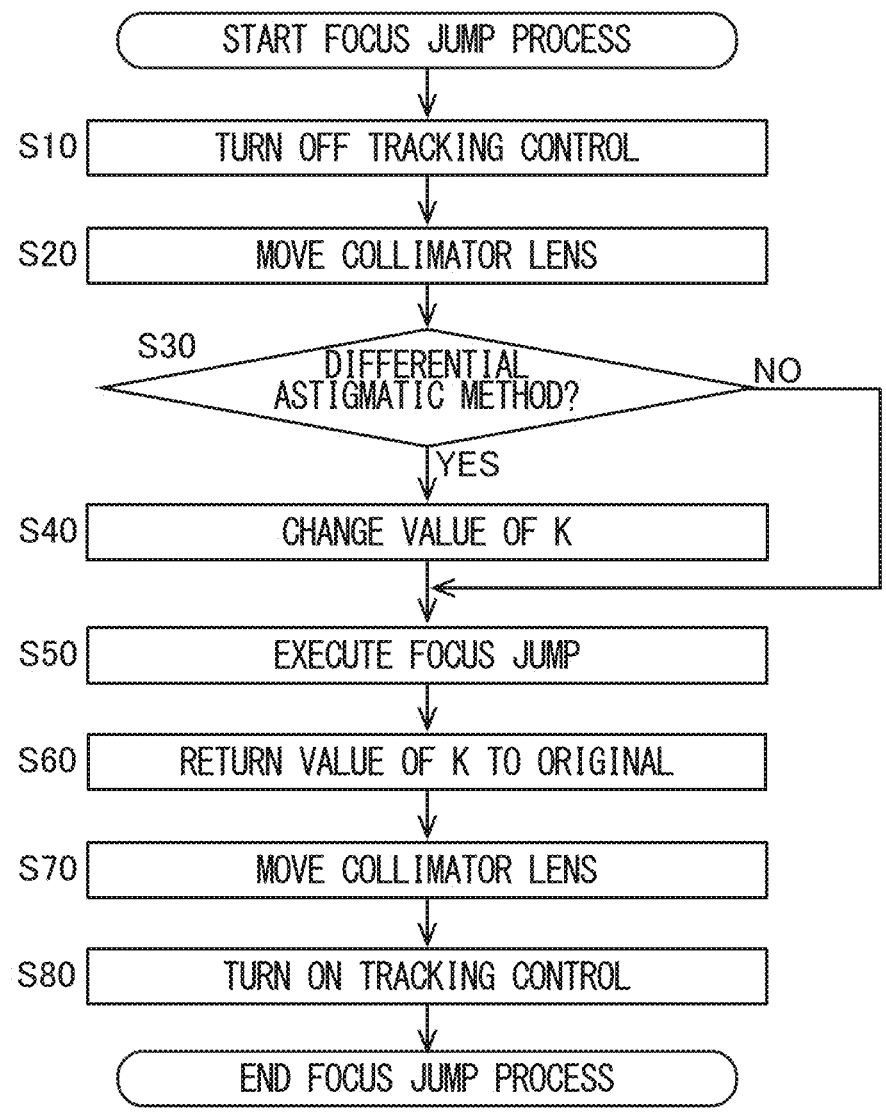
FIG. 7 is a flowchart showing operations of a focus jump according to a first embodiment.

Reverting to FIG. 7, the explanation of focus jump process is continued. At step S50, the DSP 32 executes a focus jump. More specifically, the DSP 32 feeds a kick pulse as a focus drive signal FD to the actuator 21. Thereafter, when the focus error signal FE has satisfied the brake start condition, the DSP 32 feeds a brake pulse as a focus drive signal FD to the actuator 21.

After the execution of the focus jump, the DSP 32 returns the K value to the original one (step S60). Next, the BEX motor 22 moves the collimator lens 17 (step S70). The movement extent of the collimator lens 17 in step S70 may be set to a movement extent that is needed to make a change from a current spherical aberration correction amount to a spherical aberration correction amount suitable for a target recording layer. Finally, the DSP 32 turns ON the tracking control (step S80). Thus, the focus jump process is ended.

Figure 9:
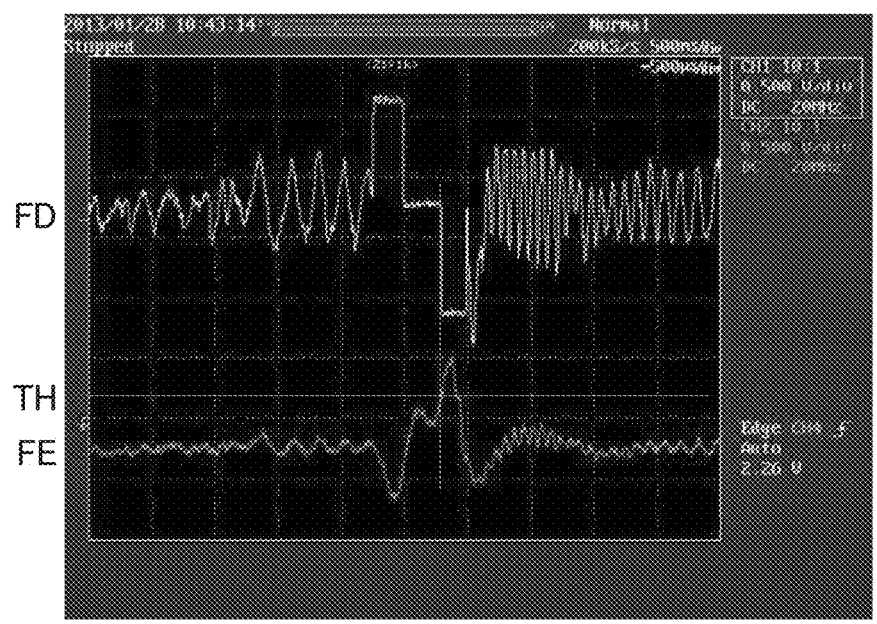
FIG. 9 is a view showing waveforms of a focus error signal of the differential astigmatic method and a focus drive signal in the focus jump process according to the first embodiment.

FIG. 9 shows waveforms of a focus error signal of the differential astigmatic method and a focus drive signal in the focus jump process according to the first embodiment.

With the focus error signal of the differential astigmatic method in the focus jump process according to the first embodiment shown in FIG. 9, crosstalk can be suppressed to an extent more than with the focus error signal of the astigmatic method shown in FIG. 5. Moreover, the fake signal can be reduced to an extent more than with the conventional focus error signal of the differential astigmatic method shown in FIG. 6. Thus, stabilization of the focus jump with the differential astigmatic method adopted can be achieved.

The optical disc device according to this embodiment described above includes the optical pickup 1 and the DSP 32. The DSP 32 has a focus-error-signal generation section for generating a focus error signal of the differential astigmatic method by using K used in above-described Equation (2) and an electric signal outputted from the photodetector 20. Also, the DSP 32 controls the optical pickup 1 so as to execute a focus jump operation such that the focus position of applied light of the optical pickup 1 is moved from a first recording layer to a second recording layer of the optical disc 2. Further, the DSP 32 temporarily changes the value of K that the focus-error-signal generation section uses to generate a focus error signal of the differential astigmatic method when the focus jump operation is executed by using the focus error signal of the differential astigmatic method.

With the constitution described above, it is possible to change the value of K temporarily to such a value that crosstalk of the focus error signal of the differential astigmatic method can be suppressed and moreover the fake signal can be reduced during the focus jump with the differential astigmatic method adopted. Thus, stabilization of the focus jump with the differential astigmatic method adopted can be fulfilled.

Furthermore, the DSP 32 selects the value of K for the temporary change through steps of setting such a value of K that a maximum value of the fake signal generated in the focus error signal of the differential astigmatic method does not meet the brake start condition in the focus jump operation and then, if the set value of K causes the amplitude level of the focus error signal of the differential astigmatic method to become equal to or higher than a certain level, re-setting such a value of K that the amplitude level becomes less than the certain level, where the finally set value of K is taken as the temporary change value of K.

The focus error signal of the differential astigmatic method is adopted basically with a view to suppressing the crosstalk. With such constitution, since preference is given to the suppression of crosstalk over the redaction of the fake signal, the advantage of the focus error signal of the differential astigmatic method is not impaired. However, the reduction of the fake signal may be insufficient in some cases depending on the combination of the optical pickup 1 and the optical disc 2. In this respect, a second embodiment that allows the reduction of the fake signal to be furthered may be carried out.

Second Embodiment

First, before the start of a focus jump process, a focus search for the DSP 32 to grasp the recording layer of the optical disc 2 is executed by using the focus error signal of the astigmatic method, so that values of the first balance factor and the second balance factor are determined so as not to cause any offset of the center of the S-shaped balance. Then, since the balance adjustment of the sub-beam component of the focus error signal can be considered as similar in settings to the balance adjustment of the main-beam components of the focus error signal, a value resulting from making a specified calculation on a determinate value of the first balance factor is assumed as a determinate value of the third balance factor while a value resulting from making a specified calculation on a determinate value of the second balance factor is assumed as a determinate value of the fourth balance factor.

Figure 10:
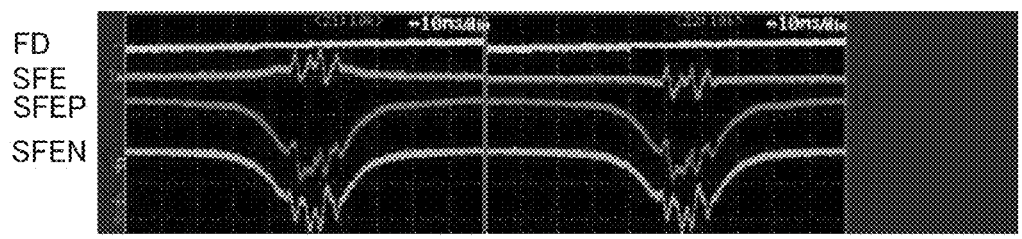
FIG. 10 is a view showing signal waveforms of a sub-beam component of a focus error signal in a focus search process.

FIG. 10 shows signal waveforms of a sub-beam component SFE of a focus error signal in a focus search process. Reference sign SFEP in FIG. 10 denotes a push component (E+H) of the sub-beam component, and SFEN in FIG. 10 denotes a pull component (F+G) of the sub-beam component. The right portion of the drawing shows signal waveforms with the value of the third balance factor and the value of the fourth balance factor set each to 0, while the left portion of the drawing shows signal waveforms with the value of the third balance factor and the value of the fourth balance factor set to the above-mentioned determinate values, respectively.

Changing the value of the third balance factor and the value of the fourth balance factor from 0 to determinate values causes the offset of the sub-beam component SFE to become larger, causing the fake signal to become larger.

Figure 11:
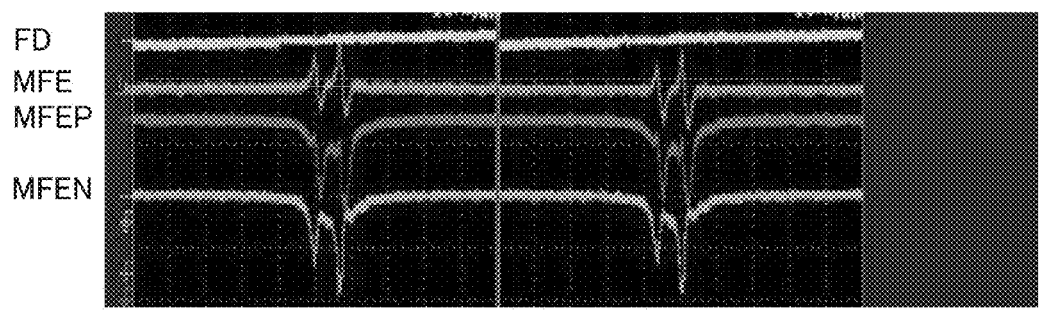
FIG. 11 is a view showing signal waveforms of a main-beam component of a focus error signal in a focus search process.

FIG. 11 shows signal waveforms of a main-beam component MFE of a focus error signal in a focus search process. Reference sign MFEP in FIG. 11 denotes a push component (A−D) of the main-beam component, and MFEN in FIG. 11 denotes a pull component (C−B) of the main-beam component. The right portion of the drawing shows signal waveforms with the value of the first balance factor and the value of the second balance factor set each to 0, while the left portion of the drawing shows signal waveforms with the value of the third balance factor and the value of the fourth balance factor set to the above-mentioned determinate values, respectively.

Even changing the value of the first balance factor and the value of the second balance factor from 0 to determinate values does not cause the offset of the main-beam component MFE to became larger. That is, even if the value of the first balance factor and the value of the second balance factor are changed, the offset of the main-beam component MFE does not become larger.

Therefore, setting the value of the first balance factor and the value of the second balance factor each to 0 allows the fake signal to be reduced. The balance set in the original balance adjustment can appropriately be maintained by increasing the value of the first balance factor from the aforementioned determinate value to an extent corresponding to a decrement of the value of the third balance factor and moreover by increasing the value of the second balance factor from the aforementioned determinate value to an extent corresponding to a decrement of the value of the fourth balance factor. This embodiment is so designed as to execute such temporary changes in the values of the balance factors as described above.

Operations of the focus jump according to this embodiment are described below with reference to the flowchart shown in FIG. 12.

Figure 12:
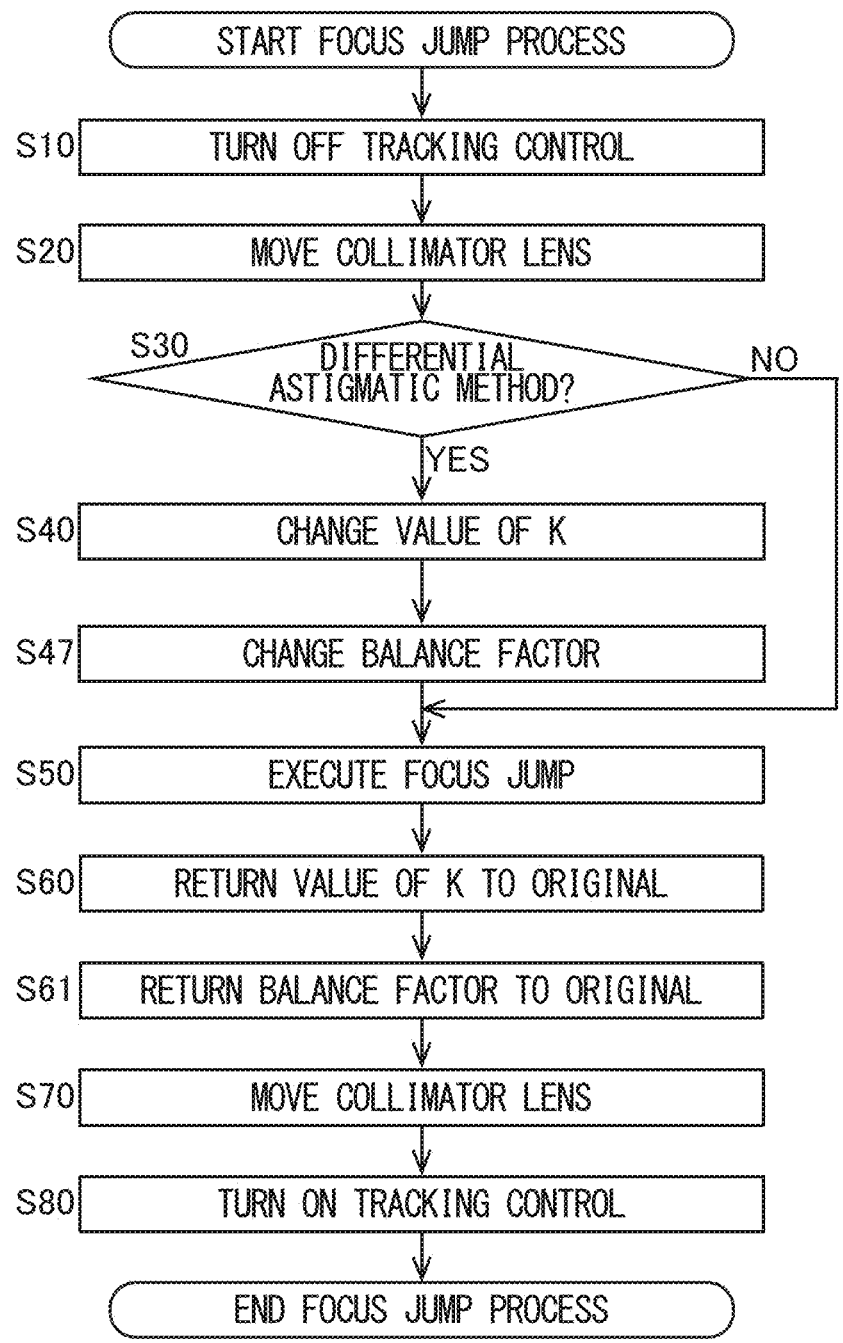
FIG. 12 is a flowchart showing operations of a focus jump according to a second embodiment.

The flowchart shown in FIG. 12 differs from the flowchart of the first embodiment shown in FIG. 7 in that step S47 is provided immediately after step S40 and moreover that step S61 is provided immediately after step S60. In addition, step S40 and step S47 are replaceable with each other in order. Similarly, step S60 and step S61 are also replaceable with each other in order.

At step S47, the DSP 32 changes the value of the first balance factor and the value of the second balance factor each to 0, increases the value of the first balance factor from the aforementioned determinate value to an extent corresponding to a decrement of the value of the third balance factor, and increases the value of the second balance factor from the aforementioned determinate value to an extent corresponding to a decrement of the value of the fourth balance factor.

Also at step S61, the DSP 32 returns the values of the first to fourth balance factors to their aforementioned determinate values, respectively.

Figures 13, 14:
FIG. 13 is a view showing waveforms of a focus error signal of the differential astigmatic method and a focus drive signal in the focus jump process according to the second embodiment.
FIG. 14 is a view showing waveforms of a focus error signal of the differential astigmatic method and a focus drive signal in the focus jump process according to the first embodiment.

FIG. 13 shows waveforms of a focus error signal of the differential astigmatic method and a focus drive signal in the focus jump process according to the second embodiment. For comparison's sake, FIG. 14 shows waveforms of a focus error signal of the differential astigmatic method and a focus drive signal in the focus jump process according to the first embodiment.

As apparent from the comparison between FIG. 13 and FIG. 14, in this embodiment, since the fake component of the sub-beam component in the focus error signal can be reduced during the focus jump with the differential astigmatic method adopted, the fake signal contained in the focus error signal can be reduced.

In the optical disc device according to this embodiment described above, during execution of the focus jump operation using the focus error signal of the differential astigmatic method, the DSP 32 decreases the third balance factor and the fourth balance factor for balance adjustment of the sub-beam component of the focus error signal, adds the decrement of the third balance factor to the first balance factor for balance adjustment of the main-beam component of the focus error signal, and adds the decrement of the fourth balance factor to the second balance factor for balance adjustment of the main-beam component of the focus error signal.

With such constitution, during the focus jump with the differential astigmatic method adopted, the fake signal of the focus error signal of the differential astigmatic method can be reduced to an extent more than in the first embodiment, so that a more stable focus jump can be fulfilled.

Third Embodiment

In the above-described second embodiment, processing for changing balance factors in step S47 is necessarily executed for each focus jump with the differential astigmatic method adopted. However, without execution of the processing for changing the value of K in step S46 of FIG. 8, it never occurs that the fake signal triggers the brake start condition so as to start braking at an erroneous position.

Accordingly, in this embodiment, the DSP 32 executes flow operations in which processing contents of step S47 and step S61 in the flowchart shown in FIG. 12 are partly changed. More specifically, at step S47, the DSP 32 first decides whether or not processing for changing the value of K at step S46 of FIG. 8 has been executed.

Figure 8:
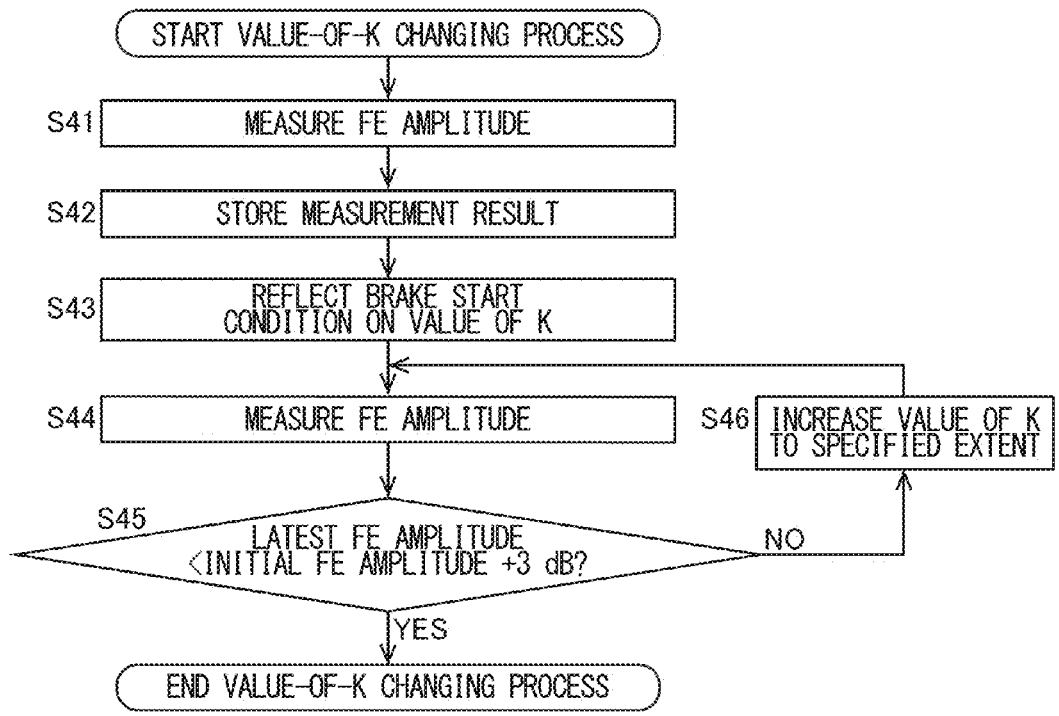
FIG. 8 is a flowchart showing a K-value changing process.

If the processing for changing the value of K at step S46 of FIG. 8 has not been executed, then the DSP 32 moves to the next step S50 without executing the processing for changing balance factors. Meanwhile, if the processing for changing the value of K at step S46 of FIG. 8 has been executed, then the DSP 32 executes the processing for changing balance factors before moving to the next step S50.

Also at step S61, as in step S47, the DSP 32 first decides whether or not processing for changing the value of K at step S46 of FIG. 8 has been executed. If the processing for changing the value of K at step S46 of FIG. 8 has not been executed, then the DSP 32 moves to the next step S70 without executing the processing for returning the balance factors to their original ones. Meanwhile, if the processing for changing the value of K at step S46 of FIG. 8 has been executed, then the DSP 32 executes the processing for returning the balance factors to their original ones before moving to the next step S70.

In this embodiment, whereas step S60 and step S61 are replaceable with each other in order as in the second embodiment, step S40 and step S47 are not replaceable with each other in order.

In this embodiment, since balance factors are changed on condition that not enough reduction of the fake signal can be achieved only by the changing of the value of K, it is possible to lessen the time required for processing of temporarily changing parameters and restoring the original parameters before the changing and moreover lessen the burden imposed on the DSP 32 on condition that not enough reduction of the fake signal can be achieved only by the changing of the value of K.

Fourth Embodiment

In the above-described first to third embodiments, processing for changing the value of K in step S40 is necessarily executed for each focus jump with the differential astigmatic method adopted. However, the focus error signal of the differential astigmatic method is adopted basically with a view to suppressing the crosstalk.

Accordingly, if the fake signal in the focus error signal can be reduced by a method other than executing the value of K in step S40, then it is possible to suppress the crosstalk of the focus error signal of the differential astigmatic method and moreover reduce the fake signal without executing the processing for changing the value of K in step S40.

Figure 15:
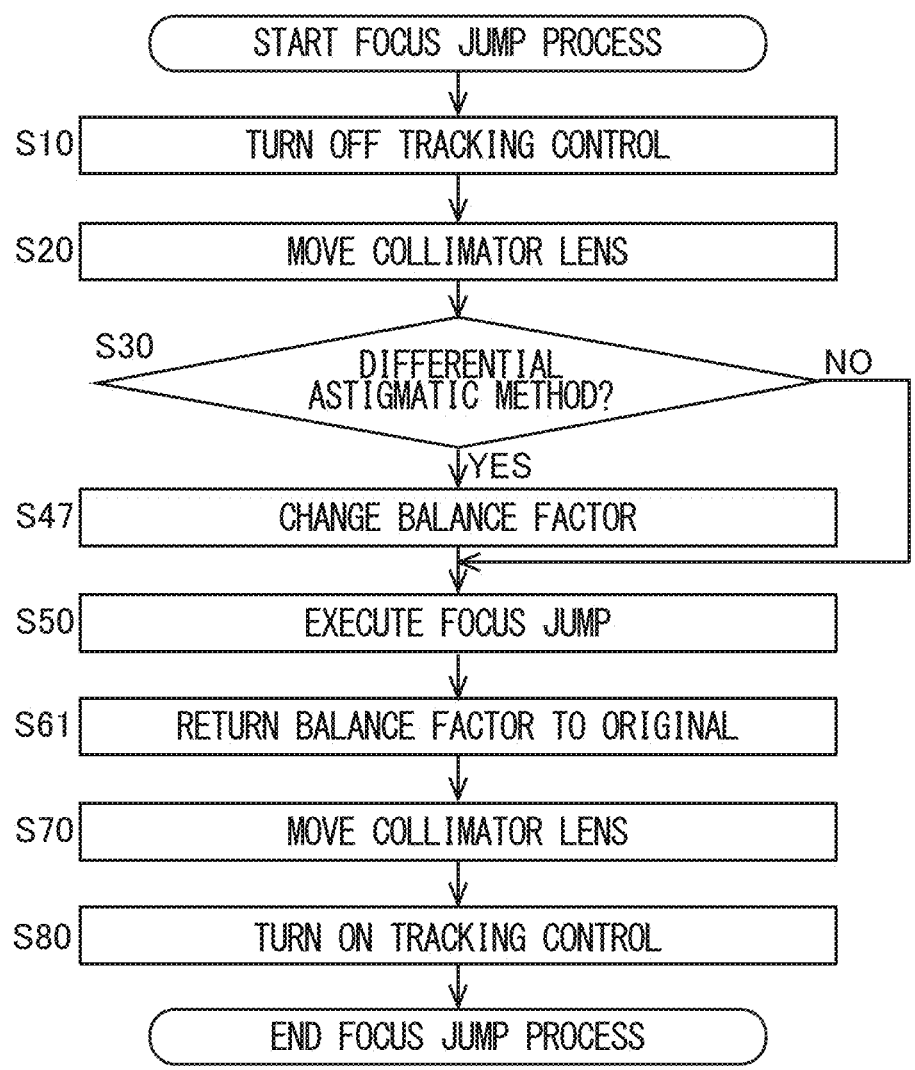
FIG. 15 is a flowchart showing operations of a focus jump according to a fourth embodiment.

Accordingly, in focus jump operations according to this embodiment, processes of the flowchart shown in FIG. 15 are carried out. The flowchart shown in FIG. 15 differs from the flowchart of the second embodiment shown in FIG. 9 in that the processes of step S40 and step S60 are eliminated.

In this embodiment, it is possible to suppress the crosstalk of the focus error signal by adopting the differential astigmatic method and to reduce the fake signal of the focus error signal of the differential astigmatic method by temporarily changing the balance factors.

The magnitude of the fake signal greatly varies among individual optical pickups 1 or individual optical discs 2.

Therefore, it may be conceived that with use of particular optical pickups 1 or optical discs 2 that cause the fake signal to be relatively smaller, the fourth embodiment is carried out, while with use of the other optical pickups 1 or optical discs 2, any one of the first to third embodiments is carried out.

What is claimed is:

1. An optical disc device compatible with multilayer optical discs having a plurality of recording layers on one side, comprising:
    an optical pickup for applying light to an optical disc to detect return light from the optical disc by a photodetector;
    a focus-error-signal generation section for generating a focus error signal of a differential astigmatic method by using a parameter and an electric signal outputted from the photodetector;
    a control section for controlling the optical pickup to make a focus jump operation such that a focus position of the light is moved from a first recording layer to a second recording layer of the optical disc; and
    a parameter value changing section for temporarily changing a value of the parameter to be used to generate the focus error signal of the differential astigmatic method by the focus-error-signal generation section while the focus jump operation is performed by using the focus error signal of the differential astigmatic method, wherein
    the parameter value changing section temporarily changes a value of a multiplication coefficient by which a sub-beam component of the return light detected by the photodetector is multiplied.

2. The optical disc device as claimed in claim 1, wherein the parameter value changing section sets the value of the multiplication coefficient so that a maximum value of a fake signal generated in the focus error signal of the differential astigmatic method does not meet a brake start condition in the focus jump operation, and then if an amplitude level of the focus error signal of the differential astigmatic method is equal to or higher than a certain level due to the set value of the multiplication coefficient, the parameter value changing section re-sets the value of the multiplication coefficient so that the amplitude level is less than the certain level, and takes the finally set value of the multiplication coefficient as the value of the temporary changing.

3. The optical disc device as claimed in claim 2, wherein the parameter value changing section
    when re-setting the value of the multiplication coefficient, temporarily decreases a balance factor for balance adjustment of a sub-beam component of the focus error signal, and temporarily adds a decrement of the balance factor for balance adjustment of the sub-beam component of the focus error signal to a balance factor for balance adjustment of a main-beam component of the focus error signal, and
    when not re-setting the value of the multiplication coefficient, changes neither the balance factor for balance adjustment of the sub-beam component of the focus error signal nor the balance factor for balance adjustment of the main-beam component of the focus error signal.

4. The optical disc device as claimed in claim 1, wherein the parameter value changing section temporarily decreases a balance factor for balance adjustment of a sub-beam component of the focus error signal, and temporarily adds a decrement of the balance factor for balance adjustment of the sub-beam component of the focus error signal to a balance factor for balance adjustment of a main-beam component of the focus error signal.

5. A focus jump method for multilayer optical discs having a plurality of recording layers on one side, comprising:
    a first step of generating a focus error signal of a differential astigmatic method by using a parameter and an electric signal outputted from a photodetector of an optical pickup; and
    a second step of temporarily changing the value of the parameter to be used to generate the focus error signal of the differential astigmatic method while a focus jump operation for moving a focus position of applied light of the optical pickup from a first recording layer to a second recording layer of the multilayer optical disc is performed by using the focus error signal of the differential astigmatic method, wherein
    the second step is a step of temporarily changing a value of a multiplication coefficient by which a sub-beam component of return light detected by the photodetector is multiplied.

6. The focus jump method as claimed in claim 5, wherein the second step is a step of setting the value of the multiplication coefficient so that a maximum value of a fake signal generated in the focus error signal of the differential astigmatic method does not meet a brake start condition in the focus jump operation, and then if an amplitude level of the focus error signal of the differential astigmatic method is equal to or higher than a certain level due to the set value of the multiplication coefficient, re-setting the value of the multiplication coefficient so that the amplitude level is less than the certain level, and taking the finally set value of the multiplication coefficient as the value of the temporary changing.

7. The focus jump method as claimed in claim 6, wherein the second step is a step of,
    when the value of the multiplication coefficient is re-set, temporarily decreasing a balance factor for balance adjustment of a sub-beam component of the focus error signal, and temporarily adding a decrement of the balance factor for balance adjustment of the sub-beam component of the focus error signal to a balance factor for balance adjustment of a main-beam component of the focus error signal, and
    when the value of the multiplication coefficient is not re-set, changing neither the balance factor for balance adjustment of the sub-beam component of the focus error signal nor the balance factor for balance adjustment of the main-beam component of the focus error signal.

8. The focus jump method as claimed in claim 5, wherein the second step is a step of temporarily decreasing a balance factor for balance adjustment of a sub-beam component of the focus error signal, and temporarily adding a decrement of the balance factor for balance adjustment of the sub-beam component of the focus error signal to a balance factor for balance adjustment of a main-beam component of the focus error signal.

* * * * *